United States Patent [19]

Waldhauser

[11] 4,275,761
[45] Jun. 30, 1981

[54] DUCT ASSEMBLY FOR ROTOR-POWERED MOBILE SPRINKLER

[75] Inventor: Kurt Waldhauser, Voitsberg, Austria

[73] Assignee: Ing. Waldhauser Maschinenfabrik Ges.m.b.H. & Co. KG, Maria Lankowitz, Austria

[21] Appl. No.: 34,205

[22] Filed: Apr. 27, 1979

[30] Foreign Application Priority Data

Jan. 8, 1979 [AT] Austria ................ 141/79

[51] Int. Cl.³ .......................................... F16L 55/14
[52] U.S. Cl. ................................ 137/595; 137/596; 251/6; 251/9; 138/141; 138/DIG. 11
[58] Field of Search .................... 251/4–10; 137/596, 595; 417/474, 475, 476, 477; 138/141, DIG. 11

[56] References Cited

U.S. PATENT DOCUMENTS

| 1,024,876 | 4/1912 | Barbour | 251/8 |
|---|---|---|---|
| 2,987,004 | 6/1961 | Murray | 417/477 |
| 3,016,915 | 1/1962 | Moeller | 137/595 |
| 3,075,551 | 1/1963 | Smith et al. | 251/7 X |
| 3,176,622 | 4/1965 | Pfeiffer | 417/477 |
| 3,422,855 | 1/1969 | Weyer | 138/141 |
| 3,543,805 | 12/1970 | Matthews et al. | 138/141 |
| 3,561,493 | 2/1971 | Maillard et al. | 138/141 |
| 3,649,138 | 3/1972 | Clay et al. | 417/477 |
| 3,695,576 | 10/1972 | Kane et al. | 251/5 |
| 3,814,547 | 6/1974 | Kitrilakis et al. | 417/478 |
| 4,102,612 | 7/1978 | Ritter | 417/477 |
| 4,131,399 | 12/1978 | Calvet | 417/477 |

FOREIGN PATENT DOCUMENTS 346707 11/1978 Austria.
1242222 8/1971 United Kingdom ............ 251/8

Primary Examiner—William R. Cline
Assistant Examiner—H. Jay Spiegel
Attorney, Agent, or Firm—Karl F. Ross

[57] ABSTRACT

A mobile sprinkler propelled by water pressure has a bellows coupled with a ratchet drive, water being alternately admitted to the bellows under pressure via one conduit and discharged therefrom via another conduit forming part of a squeeze-duct assembly. The assembly includes a rigid housing against whose sidewalls the two conduits are alternately flattened by a rotating valve body coupled with the ratchet drive, each conduit being of substantially O-shaped cross-section in its uncompressed state and consisting of a relatively thick-walled inner tube of elastomeric material, a relatively thin-walled intermediate tube of flexible synthetic-resin fabric and a relatively thin-walled outer tube also made of elastomeric material.

3 Claims, 3 Drawing Figures

DUCT ASSEMBLY FOR ROTOR-POWERED MOBILE SPRINKLER

FIELD OF THE INVENTION

My present invention relates to a duct assembly for a water-powered mobile sprinkler.

BACKGROUND OF THE INVENTION

In my earlier Austrian Pat. No. 346,707 issued Nov. 27, 1978, whose entire disclosure is herewith incorporated by reference, I describe a water-powered sprinkler wherein the pressure of the water ejected by the sprinkler is employed to displace it along the ground.

To this end the device has a chassis riding via wheels on the ground for entrainment by a hose which is laid down in the field to be irrigated in the path that the sprinkler should follow. The sprinkler is provided with an extensible bellows having a resiliently deformable inlet conduit connected via the hose to a supply of water under pressure and a similar outlet conduit connected to a sprinkler head, these conduits thus constituting extensions of the sprinkler hose. This bellows is biased by a spring into a compressed condition and the inlet and outlet conduits form with one or more blocking elements a duct assembly that alternately opens and closes the one conduit while closing the other.

The bellows is connected via a ratchet mechanism to the drive wheels of the chassis and also to a operating mechanism for the rotation of a valve body in a rigid housing surrounding the duct assembly. In addition, a reel on which the hose is wound as this device moves along the field is also powered via the one-way ratchet coupling by the bellows.

With this system when the inlet conduit feeding the bellows is open and the outlet conduit is closed, water under pressure flows into the bellows to expand it to a predetermined maximum size whereby the one-way ratchet coupling is stepped, e.g. in the direction in which it does not transmit rotation. Furthermore, during this expansion a heavy spring is loaded by the bellows.

At the end of the expansion of the bellows, the valve assembly is reversed to close off the inlet conduit and to connect the outlet conduit to the sprinkler heads. The biasing spring therefore compresses the bellows, forcing the water under considerable pressure out of the heads to sprinkle the field, and simultaneously stepping both the drive wheel and the hose-takeup reel. When the bellows is compressed to a predetermined minimum size, the valve is again reversed for repetition of the above-described cycle.

In such an arrangement it is therefore possible for the sprinkling apparatus to move around the field under its own power. No separate drive motor or the like need be provided for this sprinkler as it obtains all of the necessary energy for its displacement from the pressurized water fed to it. The liquid being sprayed by such an arrangement is not pure. In fact, the liquid is frequently laden with fertilizers, some of which do not dissolve completely but remain instead in particulate form. Furthermore, it is common practice to feed such a device via a pump directly from a stream or pond, in which case the water is relatively dirty. Hence, the machine is designed as much as possible to avoid passing this water through sensitive equipment.

In order to obviate the need for a delicate valve, whose seat could become fouled or damaged by foreign matter in the liquid passing through it, my above-cited Austrian patent 346,707 uses a rotatable valve body alternately flattening the input and output conduits against the sidewalls of a rigid valve housing; this valve body carries three angularly equispaced rollers. The valve housing is shaped so that, as the valve body rotates, at any given time one of the conduits will be flattened and the flow through it will be blocked whereas flow will be possible in the other conduit.

The problem with such an arrangement is that the conduits are subject to considerable wear by the periodic flexing and thus must be replaced often.

OBJECT OF THE INVENTION

It is, therefore, the object of the present invention to provide an improved conduit for a squeeze-duct assembly which can be flattened repeatedly without significant deterioration but which nonetheless in an unstressed condition provides a large flow cross-section.

SUMMARY OF THE INVENTION

Each of the deformable conduits of my improved squeeze-duct assembly has a cross-section which is substantially O-shaped, rather than circular as in my prior Austrian patent, that cross-section forming a pair of generally planar legs, defining respective confronting flat inner surfaces of the conduit, and a pair of C-shaped end zones interconnecting these legs. Each of these end zones has a central region, bisected by a plane parallel to and equispaced between the planes of the inner surfaces of the legs and having a relatively small radius curvature, and a pair of flanking regions with a relatively large radius of curvature connecting the respective central region with the leg regions. The latter regions are either exactly planar or slightly arcuate with a very large radius of curvature which should be at least twenty times greater than the maximum radius of curvature of the edge regions.

Each coupling is formed, according to another feature of this invention, from three concentric tubes bonded to one another. The inner and outer tubes are both made elastic material. The intermediate tube, however, is made of a highly deformable but inelastic material, such as a rugged synthetic-resin textile. The inner tube has a wall thickness that equals or exceeds the combined wall thickness of the other two tubes and is at least twice as thick as the intermediate tube. Thus it is possible to flatten the conduit, completely blocking off flow through it, without excessively deforming the intermediate tube. As a result, may improved conduit has an extremely long service life when used in conjunction with intermittently operating flow-blocking means for alternate flattening and releasing it as described above. Furthermore, when in its unstressed condition the conduit has a relatively large flow cross-section.

Such a conduit is formed by molding between a flattened mandrel and a correspondingly shaped outer steel mold. In this manner it is possible to vulcanize together the various tubes so that the final product has the desired cross-section.

BRIEF DESCRIPTION OF THE DRAWING

The above and other features of my invention will now be described in detail with reference to the accompanying drawing in which.

SPECIFIC DESCRIPTION

Figure 1:
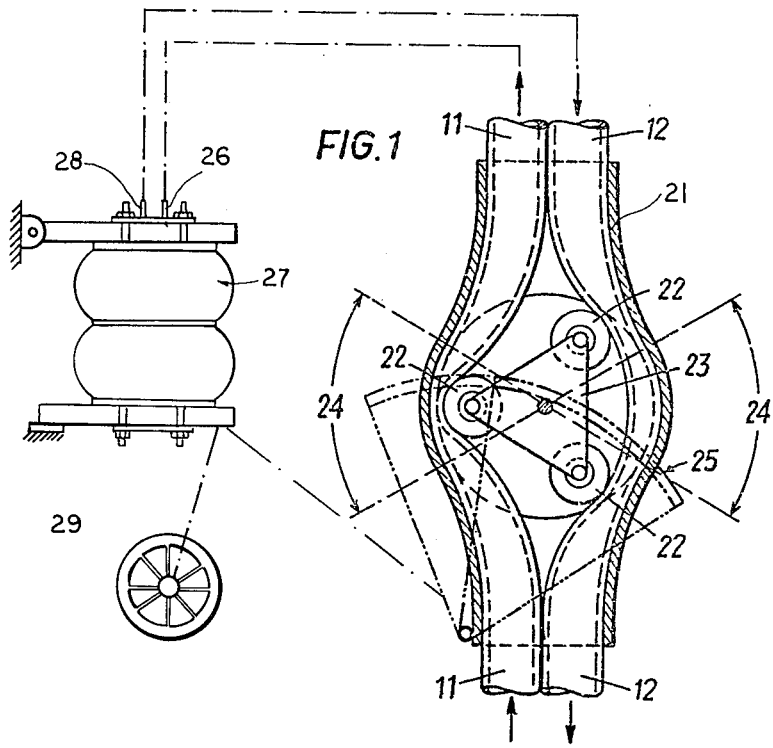
FIG 1 is a largely schematic view showing a duct assembly according to this invention in combination with the principal elements of a sprinkler drive as described in my above-cited Austrian patent.

An agricultural sprinkler according to my above-cited Austrian patent has an inlet conduit 11 continuously pressurized by means of a pump, not shown, leading to an inlet nipple 26 of a bellows 27, and an outlet conduit 12 leading from an outlet nipple 28 on the bellows 27 to conventional sprinkler heads (also not shown) on the machine. The conduits 11 and 12, which are of identical construction, pass through a rigid valve housing 21 having a widened central part whose sidewalls form two bulges 24 against which the conduits 11 and 12 may be pressed by three rollers 22 carried at respective corners of a rotatable valve body 23 having the shape of an equilateral triangle. Bulges 24, having an arc width of 60°, are curved about the center of rotation of body 23 so that at any time one of the rollers 22 will be blocking one of the conduits whereas the other two rollers might engage the other conduit but will not block flow through it.

The bellows 27 can expand and contract and is effective through a nonillustrated ratchet mechanism to rotate a drive wheel 29 of the machine and to allow a segment rear 25 coupled with the valve body 23 to rotate this valve body back and forth through approximately 180°.

In normal use water or liquid fertilizer under pressure passes through the conduit 11 and into the bellows 27 to expand it, the outflow from the bellows 27 being blocked by one of the rollers 22 flattening the conduit 12. Once the bellows 27 reaches a predetermined maximum size, it releases the segment gear 25 to allow the position of the valve body to change into the reverse of that shown in FIG. 1, so that flow into the bellows 27 is stopped and flow out of the bellows to the sprinkler heads is possible via conduit 12. A spring will therefore compress the bellows 27, simultaneously rotationally stepping the wheel 29 and a hose-takeup reel that is not illustrated. Once the bellows 27 reaches a predetermined minimum size, the segment gear 25 is released to allow the pressure in the hoses 11 and 12 to step the rollers 22 through 60° to close off the outlet conduit 12 and open up the inlet conduit 11 for repeating the above-described cycle of operations. More details of the exact operation of the sprinkler can be gathered from my above-cited Austrian patent.

Figure 2:
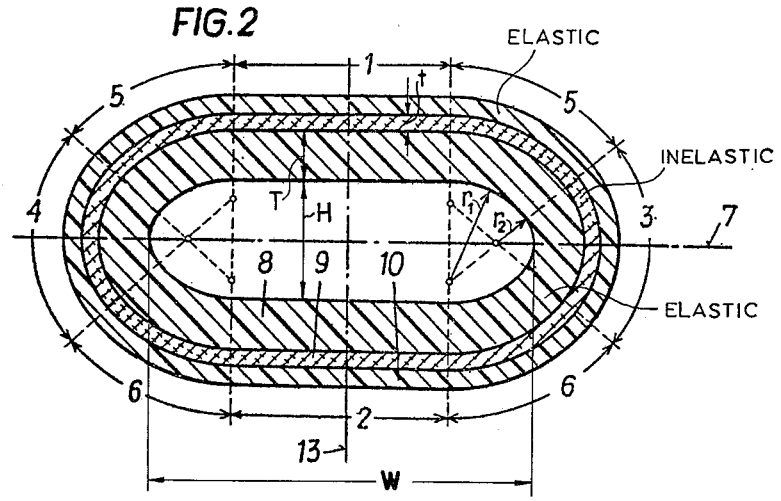
FIG. 2 is a large-scale cross-section through a conduit according to this invention in its undeformed condition.

As shown in FIG. 2, the cross-section of each conduit 11 and 12 has in its undeformed condition a pair of planar opposite legs 1 and 2 perpendicular to a transverse plane of symmetry 13 and a pair of C-shaped end zones bisected by a longitudinal plane of symmetry 7; the two end zones consist of respective central regions 3, 4 and flanking regions 5, 6. The central regions 3 and 4 each extend over 80° and the flanking regions 5 and 6 span over 50° each. These regions 5 and 6 have relatively large radii of curvature $r_1$ while the regions 3 and 4 have relatively small radii of curvature $r_2$, the latter being between one-half and one-third of the former.

Each conduit 11, 12 consists of an inner tube 8, having a thickness T, and an intermediate tube 9 and an outer tube 10 both having thicknesses t equal to slightly less than half the thickness T. The flow cross-section has a height H equal to between one-half and one-quarter, but slightly less than one-third, of its width W. The inner and outer tubes 8 and 10 are formed of a durable synthetic-resin elastomer. The tube 9 is formed of a durable but inelastic sythetic-resin textile.

Figure 3:
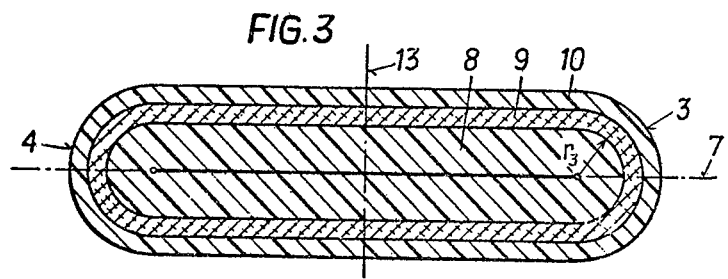
FIG. 3 is a section similar to FIG. 2, showing the conduit in its flattened state.

When the conduit according to this invention is flattened as shown in FIG. 3, its intermediate tube 9 is deformed at its ends where its radius of curvature $r_3$ becomes approximately equal to T. Thus, creasing or kinking of this intermediate tube 9 is completely avoided. The tubes 8 and 10 can easily withstand substantially more compression than the tube 9, so that a recurrent local compression of the conduit in the manner shown in FIG. 3 will not subject it to appreciable wear. In fact, the elastic limit of the various materials is not even approached, so that continuous periodic flattening of the conduits according to this invention can take place over a very long time before they wear out.

I claim:

1. In a squeeze-duct assembly with two juxtaposed, substantially identical resiliently deformable conduits traversing a rigid housing with two sidewalls having oppositely curved bulges centered on an axis of rotation of a valve body in said housing, said valve body being disposed between said conduits and carrying three angularly equispaced pressure rollers for alternately compressing said conduits against said sidewalls to block the passage of a fluid therethrough, the improvement wherein each of said conduits has an elongated substantially oval cross-section in its uncompressed state, said cross-section having two generally planar legs paralleling said axis and C-shaped end zones interconnecting said legs, each conduit consisting of an inner tube of elastomeric material, an intermediate tube of substantially inelastic synthetic-resin fabric and an outer tube of elastomeric material all bonded to one another, said inner tube having a wall thickness at least equal to the combined wall thickness of said intermediate and outer tubes, the spacing of said rollers from said sidewalls at their points of closest approach equaling the thickness of either conduit in a flattened state in which said legs are in full internal surface contact with each other, each of said end zones having a central region with a relatively small radius of curvature and a pair of flanking regions with a relatively large radius of curvature connecting the respective central region with said legs.

2. The assembly defined in claim 1 wherein said large radius is equal to at least twice said small radius in the uncompressed state of each conduit.

3. The assembly defined in claim 1 or 2 wherein said inner tube has at least double the wall thickness of said intermediate and outer tubes.

* * * * *